(12) United States Patent
Drescher et al.

(10) Patent No.: US 9,353,797 B2
(45) Date of Patent: May 31, 2016

(54) BEARING RING FOR A BEARING, IN PARTICULAR FOR A ROLLING OR SLIDING BEARING

(71) Applicant: Schaeffler Technologies AG & Co. KG, Herzogenaurach (DE)

(72) Inventors: Klaus Drescher, Kutzberg (DE); Frank Benkert, Waigolshausen (DE); Philipp Horning, Bamberg (DE); Armin Gerner, Pommersfelden (DE); Bernd Wittmann, Pommersfelden (DE); Horst Brehm, Bischberg (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 14/423,251

(22) PCT Filed: Aug. 5, 2013

(86) PCT No.: PCT/DE2013/200095
§ 371 (c)(1),
(2) Date: Feb. 23, 2015

(87) PCT Pub. No.: WO2014/029396
PCT Pub. Date: Feb. 27, 2014

(65) Prior Publication Data
US 2015/0219163 A1    Aug. 6, 2015

(30) Foreign Application Priority Data
Aug. 24, 2012   (DE) .......................... 10 2012 215 085

(51) Int. Cl.
| | |
|---|---|
| *F16C 41/00* | (2006.01) |
| *F16C 33/58* | (2006.01) |
| *F16C 33/62* | (2006.01) |

(Continued)

(52) U.S. Cl.
CPC ................. *F16C 41/00* (2013.01); *F16C 19/06* (2013.01); *F16C 33/58* (2013.01); *F16C 33/581* (2013.01); *F16C 33/62* (2013.01); *F16C 41/007* (2013.01); *G01L 3/102* (2013.01); *G01L 5/0023* (2013.01); *F16C 2202/40* (2013.01); *F16C 2202/44* (2013.01)

(58) Field of Classification Search
CPC .............................. F16C 41/007; G01L 3/102
See application file for complete search history.

(56) References Cited

U.S. PATENT DOCUMENTS

| 6,161,962 | A  | 12/2000 | French et al. |
| 8,079,275 | B2 | 12/2011 | Grab et al. |

(Continued)

FOREIGN PATENT DOCUMENTS

| DE | 10136438 | 3/2002 |
| DE | 69732183 | 2/2006 |

(Continued)

*Primary Examiner* — Thomas R. Hannon
(74) *Attorney, Agent, or Firm* — Volpe and Koenig, P.C.

(57) ABSTRACT

A bearing ring, in particular of a rolling bearing or a sliding bearing, including a body made of a magnetostrictive material, having a first raceway (2) and a second, axially spaced apart, raceway (2') and a permanent magnetization (3) which is impressed into the material of the body between the raceways (2, 2') and which runs around an axis of rotation (9) of the body. According to the invention, the bearing ring achieves the object of improving the structural integration of a torque sensor into a bearing, which torque sensor generates a torque-dependent magnetic field by utilizing the inverse magnetostrictive effect.

11 Claims, 1 Drawing Sheet

(51) Int. Cl.
*G01L 3/10* (2006.01)
*F16C 19/06* (2006.01)
*G01L 5/00* (2006.01)

(56) References Cited

U.S. PATENT DOCUMENTS

| | | |
|---|---|---|
| 2005/0160834 A1 | 7/2005 | Nehl et al. |
| 2010/0305879 A1 | 12/2010 | Grab et al. |
| 2012/0006128 A1 | 1/2012 | Grab et al. |
| 2012/0118081 A1 | 5/2012 | Eicke et al. |
| 2013/0272636 A1 | 10/2013 | Heim et al. |

FOREIGN PATENT DOCUMENTS

| | | |
|---|---|---|
| DE | 102006054179 | 5/2008 |
| DE | 102007017705 | 10/2008 |
| DE | 102007046749 | 11/2008 |
| DE | 102008056302 | 5/2010 |
| DE | 102010047928 | 4/2012 |
| JP | 2001033322 | 2/2001 |

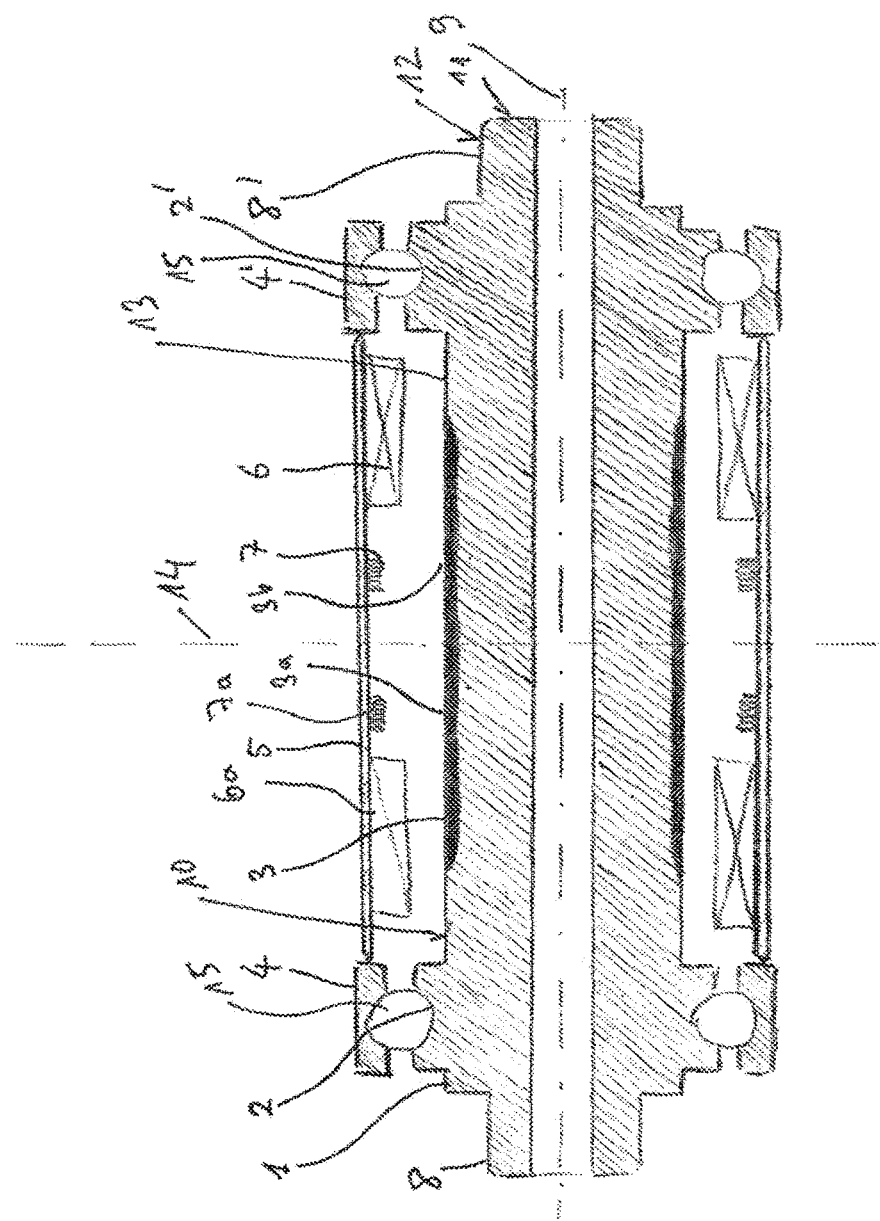

BEARING RING FOR A BEARING, IN PARTICULAR FOR A ROLLING OR SLIDING BEARING

FIELD OF THE INVENTION

Background

The invention relates to a bearing ring with two axially spaced apart bearing raceways, in particular a bearing ring for a rolling bearing or a sliding bearing, as well as a bearing including such a bearing ring.

It is known from practice to rotatably mount a rotating part, in particular a shaft, by means of at least one bearing, in particular by means of a rolling bearing or a sliding bearing, with respect to a connecting construction, in particular with respect to a bearing housing. The rotating part, in particular the shaft, in many cases transmits a torque which is transmitted at least partially onto the bearing so that there arises the need to detect the torque in the region of the bearing, in particular in the region of one of the bearing rings of the rolling or sliding bearing.

The magnetostrictive measurement principle for detecting torques in shafts is fundamentally known from the prior art, wherein, using the inverse magnetostrictive effect, mechanical stresses which are generated by a torque introduced into a shaft generate a magnetic field in the magnetostrictive material of the shaft, which magnetic field is a gauge for the mechanical stresses and thus for the torque.

DE 101 36 438 A1 describes with reference to FIG. 13 an outer bearing ring of a single-row rolling bearing, namely of a of a single-row ball bearing, wherein the outer bearing ring has a circular magnetization so that, under the action of a radially engaging force from the outside, an additional axial magnetization is generated on the outer bearing ring, the magnetic field of which magnetization is detected by a magnetostatic sensor element between the two bearing rings of the rolling bearing so that the radial force on the rolling bearing can be measured. It remains open here how the torque of the shaft which is rotatably mounted in the single-row ball bearing can be measured.

DE 697 32 183 T2 describes a double-row tapered roller bearing with a shared first bearing ring and a two-part second bearing ring, a spacer ring being arranged between the two parts of the second bearing ring, on which spacer ring a gear wheel is fastened which serves as a signal transmitter for detecting the rotational speed.

DE 10 2010 047 928 A1 describes a double-row bearing ring of a rolling bearing, in particular of a tapered roller bearing, wherein sensors such as, for example, strain gauges or piezoceramic force sensors are arranged on the lateral surface pointing towards the other bearing ring centrally between the two raceways of the bearing ring.

JP 2001033322 AA (abstract) describes a bearing ring of a single-row ball bearing, wherein a structured coating of a magnetoelastic material is applied on the lateral surface which points towards the other bearing ring of the ball bearing in order to act as a signal transmitter for a torque sensor which detects the torque-dependent magnetic field of the structured coating between the two bearing rings. The structured coating is arranged on an axially extended portion to one side of the raceway of the spherical rolling bodies.

U.S. Pat. No. 8,079,275 B2 describes an inner bearing ring for a rolling bearing formed as a single-row ball bearing, wherein outside of the bearing ring, axially next to a front surface of the inner ring, a ring body composed of a magnetostrictive material is fastened on the shaft, and wherein with the other bearing ring a magnetic sensor is fastened, wherein this sensor is arranged either on an axial extension of the outer bearing ring or on a retaining sleeve fastened with the outer bearing ring so that the magnetic sensor lies radially opposite the magnetostrictive ring body.

DE 10 2006 054 179 A1 describes a shaft arrangement, comprising a shaft divided axially into an input shaft and an output shaft, a torsion element which is connected to the input shaft and the output shaft in a torque-locking manner, wherein the torsion element in a torque-free state has a permanent magnetization running around the axis of rotation of the shaft, and a torque sensor formed as a magnetic sensor which detects in a torque-loaded state of the torsion element a magnetic field which occurs outside the torsion element. The mounting of the input shaft or the output shaft is brought about by bearings which are structurally separated from the torsion element and are not described in greater detail so that the torsion element must be provided as a component to be provided in addition to the bearings.

SUMMARY

The object of the invention is to improve the structural integration of a torque sensor, which generates a torque-dependent magnetic field using the inverse magnetostrictive effect, into a bearing.

This object is achieved according to the invention by a bearing ring, in particular of a rolling bearing or a sliding bearing, comprising a body composed of a magnetostrictive material, with a first bearing raceway and a second axially spaced apart bearing raceway, and a permanent magnetization which is incorporated between the bearing raceways in the material of the body and runs around an axis of rotation of the body.

The permanent magnetization, which is incorporated between the two bearing raceways of the bearing ring into the body of the bearing ring formed from a magnetostrictive material and runs around the axis of rotation of the body, supplies the torque-dependent magnetic field, wherein the bearing ring is connected to the shaft which conducts the torque in a torque-locking manner. The arrangement of the permanent magnetization between the two bearing raceways ensures that the influence of the rolling bodies, if the bearing is formed as a rolling bearing the rolling bodies of which roll along the bearing raceway, or of the other bearing ring, if the bearing is formed as a sliding bearing and sliding contact with the other bearing ring of the sliding bearing occurs in the region of the bearing raceway, is eliminated.

If, however, a magnetic field is detected in a torque-free state of the shaft by a magnetic sensor which lies radially opposite the permanent magnetization, which magnetic field is not due to stray fields, this magnetic field indicates that a plastic deformation of the relevant portion of the bearing ring has occurred in the region of the permanent magnetization and thus the bearing ring was loaded with a torque for which it was not designed.

It is preferably provided that the permanent magnetization comprises a partial magnetization close to the surface which runs around the axis of rotation in a first circumferential direction and a radially spaced apart partial magnetization distant from the surface which runs around the axis of rotation in an opposite direction to the partial magnetization close to the surface. The two partial magnetizations are matched to one another in such a manner that, in a torque-free state of the shaft or of the bearing ring, no torque-generated magnetic field escapes from the bearing ring so that a magnetic sensor assigned to the permanent magnetization at most detects magnetic interference fields but not a magnetic field which can be uniquely assigned to a torque.

It is preferably provided that the permanent magnetization or partial magnetization has a first magnetized portion which runs around the axis of rotation in the first circumferential direction and an axially spaced apart second magnetized portion which runs around the axis of rotation in an opposite direction to the first circumferential direction. The axial spacing apart of the opposite magnetizations or partial magnetizations enables the determination of the direction of rotation of the torque and further enables suppression of the influence of magnetic interference fields since, for example, only the difference between the magnetic fields of the two magnetizations is detected.

It is preferably provided that a coupling portion is provided at or close to an end of the body. The coupling portion is provided as a portion formed at the end of the body of the bearing ring, namely at the front surface of the bearing ring or close to the end of the body of the bearing ring, namely on a portion of the lateral surface of the bearing ring adjoining the front surface, in the case of which a structure is formed by formations, to which structure a portion of a shaft can be fastened in a torque-locking manner. The shaft is then rotatably mounted by the two raceways of the bearing ring together with the other bearing ring with respect to a connecting construction.

It is preferably provided in terms of the coupling portion that the coupling portion comprises a feather spring or is formed as a multi-tooth connection or as a multi-edge connection.

It is preferably provided that at least one of the bearing raceways, in particular both bearing raceways are arranged radially offset in relation to the axis of rotation opposite the portion having the permanent magnetization. The material thickness in the portion of the bearing ring having the permanent magnetization can be adjusted, for example, by material-removing post-machining of a standard bearing ring so that an increased torsion moment occurs in the body so that small torques can also easily be measured without restricting the function of the bearing ring as part of the bearing of the mounting.

It is preferably provided that the body is formed in one piece so that the bearing ring is manufactured from a single part which is comprised of a magnetostrictive material into which the at least two axially spaced apart bearing raceways are produced and which has an inner bore.

It is preferably provided that the permanent magnetization is arranged axially centrally in relation to the two bearing raceways. If two axially spaced apart magnetized portions are provided, these magnetized portions are arranged on both sides, in particular in mirror-symmetry, in relation to an imaginary, axially central middle plane in relation to which the two axially spaced apart bearing raceways are also arranged in mirror-symmetry.

The invention further relates to a bearing, comprising two bearing rings, wherein the first bearing ring, according to the invention configured in particular as an internal ring, is formed as described above.

Further advantages and features will become apparent from the dependent claims and from the description of an exemplary embodiment of the invention.

The invention will be described and explained in greater detail below with reference to the enclosed drawing.

BRIEF DESCRIPTION OF THE DRAWING

FIG. 1 shows schematically a sectioned view of an exemplary embodiment of a bearing ring according to the invention and of an exemplary embodiment of a bearing according to the invention.

DETAILED DESCRIPTION OF THE PREFERRED EMBODIMENT

FIG. 1 shows a bearing ring 1 which is formed as an inner ring of a double-row rolling bearing with spherical rolling bodies, wherein the bearing ring 1 comprises a one-piece body composed of a magnetostrictive material, with a first bearing raceway formed as a rolling raceway 2 and a second axially spaced apart bearing raceway also formed as a rolling raceway 2', and a permanent magnetization 3 which is incorporated between both rolling raceways 2, 2' into the material of the body of the bearing ring 1 and runs in a circular manner around an axis of rotation 9 of the body.

Permanent magnetization 3 is formed close to an outer lateral surface 10, which points away from the axis of rotation 9, of the body between both rolling raceways 2, 2' and comprises two axially spaced apart magnetized portions 3a, 3b formed between the rolling raceways 2, 2', wherein in the region of the first magnetized portion 3a the part of the magnetization close to the surface runs in a first circumferential direction, namely in a clockwise direction, and in the region of the second magnetized portion 3b in an opposite direction to the first circumferential direction, namely in a counter-clockwise direction.

In each of the two axially spaced apart magnetized portions 3a, 3b, the permanent magnetization 3 has a partial magnetization close to the surface which runs around the axis of rotation 9 in a first circumferential direction and a radially spaced apart partial magnetization distant from the surface which runs around the axis of rotation 9 in an opposite direction to the partial magnetization close to the surface. In concrete terms, in the region of the first magnetized portion 3a the permanent magnetization has the above-described partial magnetization which is close to the surface and runs around the axis of rotation 9 in a clockwise direction and additionally a partial magnetization distant from the surface which is radially spaced apart from the partial magnetization close to the surface towards the axis of rotation 9 and runs around the axis of rotation in the opposite direction, i.e. in a counter-clockwise direction. Correspondingly, in the region of the second magnetized portion 3b, the permanent magnetization 3 has, in addition to the partial magnetization described above which is close to the surface and runs around axis of rotation 9 in a counter-clockwise direction, a partial magnetization which is radially spaced apart therefrom and runs around the axis of rotation 9 in the opposite direction, i.e. in a clockwise direction.

In each case a coupling portion 8, 8' is formed at each of the two ends of the body of the bearing ring 1, which portion is provided for torque-fixed transmission of the torque from a shaft connected in a torque-locked manner to the coupling portion 8, 8' to bearing ring 1. Both coupling portions 8, 8' are formed identically, are separated by the respective bearing raceway 2, 2' from the permanent magnetization 3 and, for example, formed as a deformation or embossing formed on a front surface 11 or as a portion 12, directly adjoining the front surface 11, of a lateral surface 10 of the body of the bearing ring 1, in particular both coupling portions 8, 8' are formed identically and are configured as part of a positive-locking, non-positive-locking or materially engaged connection to the respective shaft, not represented pictorially, for example, as part of a feather spring connection, a multi-edge connection or a multi-tooth connection.

It is further provided in the case of the body of the bearing ring 1 that both of the bearing raceways 2, 2' are formed offset radially in relation to a portion 13 of the lateral surface 10, which portion 13 lies therebetween and has the permanent magnetization 3, i.e. in relation to the axis of rotation 9, and indeed offset away from the axis of rotation 9.

The body of the bearing ring 1 is formed in one piece, in particular produced in the case of manufacture from a substantially cylindrical piece of a magnetostrictive material, in the case of which the bearing raceways 2, 2' were formed and the central portion 13 radially offset towards the axis of rotation 9 in which the permanent magnetization 3 should be formed was produced, for example, by removing material; the coupling portions 8, 8' were also formed at both ends of the workpiece, for example, also by removing material or by a compression process. It is in particular possible, proceeding from a double-row standard ball bearing, to form the between the two raceways of the standard ball bearing by removal of material as the central portion 13 in which in a subsequent method step the permanent magnetization 3 is incorporated. The reduction in the material thickness in the central portion 13 increases the torsion of the material in the case of an externally applied torque and thus the sensitivity of the arrangement.

It is further provided in the case of the body of the bearing ring 1 that the permanent magnetization 3 is arranged axially, i.e. in the direction of axis of rotation 9, centrally between both of the bearing raceways 2, 2a. In particular, both magnetized regions 3a, 3b of the permanent magnetization 3 are arranged on both sides of an imaginary central plane 14 from which both of the bearing raceways 2, 2a have the same distance. Both bearing raceways 2, 2a and the magnetized regions 3a, 3b are formed in mirror symmetry in relation to this central plane 14, wherein the magnetized regions 3a, 3b have an only small distance to the central plane 14 and directly adjoin the central plane 14 so that the permanent magnetization 3 is arranged in general axially centrally between both of the bearing raceways 2, 2a.

The bearing ring 1 formed as an inner ring is part of a bearing which, in addition to the inner ring 1, also comprises at least one further bearing ring, namely two axially spaced apart outer rings 4a, 4', the rolling raceways of which lie opposite the rolling raceways 2, 2a of the inner ring 1 so that rolling bodies 15 enable a rotatable mounting of one bearing ring 1 relative to the at least one other bearing ring 4, 4'. A cylindrical sleeve 5 is arranged as a carrier between both axially spaced apart outer rings 4, 4', on which sleeve two pairs of magnetic sensors 7, 7a are arranged and are fixed radially opposite magnetized portions 3a, 3b of magnetization 3 on the body of inner ring 1. Two evaluation units 6, 6a are connected electrically to the magnetic sensors 7, 7a and are also fixed on the sleeve 5, which evaluation units detect, process and evaluate in each case the measurement signal of the assigned magnetic sensor 7, 7a and which lie opposite one another in pairs in relation to the axis of rotation 9.

The bearing further comprises further sensors, not represented pictorially, for example, a temperature sensor or a sensor for detecting the rotational speed and the direction of rotation of the rotating inner ring 1, wherein the measurement values of the further sensors are supplied to the evaluation units 6, 6a and are processed there.

The invention thus functions as follows:

A first input shaft under the action of torque is arranged in a rotationally conjoint manner, in particular in a torque-locking manner, on a coupling portion 8', for example, in that one end of the input shaft is connected in a non-positive-locking, positive-locking or frictionally engaged manner to portion 12 of the bearing ring 1. A second shaft to be driven is fastened as an output shaft to the other coupling portion 8. Both shafts, the input shaft and the output shaft, are mounted rotatably by the bearing ring 1 and outer rings 4, 4' about the axis 9 with respect to a stationary housing, not represented. The bearing ring 1 of the bearing is thus connected in a rotationally conjoint manner to the part upon which torque acts, i.e. the shaft mounted rotatably by the bearing ring 1.

If no torque is present in the input shaft, the magnetic sensors 7, 7a do not detect any magnetic field, with the exception of perhaps interference fields as a result of remains of the not fully screened off magnetic field of the Earth. The respective partial magnetization close to the surface or distant from the surface of axially spaced apart regions 3a, 3b of permanent magnetization 3 are matched to one another in terms of magnitude, direction and depth in such a manner that if no torque is present in the input shaft and thus no torque is transmitted to the body of the bearing ring 1, the magnetic field brought about by the permanent magnetization 3 and occurring outside the body of the bearing ring disappears and at most interference fields should be detected.

If a torque is transmitted to the output shaft via the input shaft by the body of bearing ring 1, i.e. a torque is introduced in particular by the input shaft into the body of the bearing ring 1 which is connected in a rotationally conjoint manner to the torque-carrying part, namely the input shaft, as a result of the magnetostrictive properties of the material of the body of the bearing ring 1 due to the inverse magnetostrictive effect, a first net magnetic field occurs in the region of the first magnetized portion 3a and a second net magnetic field occurs in the region of the second magnetized portion 3b, wherein the respective axial ratios, i.e. directed parallel to the axis of rotation 9, of both net magnetic fields are detected outside the body of the bearing ring 1 by the magnetic sensors 7, 7a. The respective partial magnetizations of both of the magnetized regions 3a, 3b are matched to one another in such a manner that the axial components have a different direction, but the same magnitude so that, by determining the difference, the evaluation units 6, 6a detect and process a signal which is adjusted by the magnitude of the external interference fields and corresponds to the torque in the body of the bearing ring 1.

If no torque is introduced in the body of the bearing ring 1 and at least one of the two magnetic sensors 7, 7a nevertheless detects a net magnetic field outside the body of the bearing ring 1 which is not due to interference fields, this magnetic sensor can indicate damage to the permanent magnetization 3 as a result of excessive torque so that magnetic sensors 7, 7a can also be provided as an overload display. The material thickness of the body of the bearing ring 1 can be correspondingly designed so that no permanent deformation of the material occurs within a permissible range for the torque. A clutch, especially a slip clutch, can furthermore be provided at the coupling portion 8', at which the external torque is introduced into the bearing ring 1, which clutch restricts the torque introduced into the body of the bearing ring 1 to a value below a permissible maximum value.

In the case of the exemplary embodiment described above, the bearing comprised a shared inner ring having both bearing of the raceways 2, 2',but two axially spaced apart outer rings 4, 4' structurally separated by the sleeve 5. It will be obvious that a shared outer ring can be provided which has both bearing raceways on the outer ring.

In the case of the exemplary embodiment described above, the bearing ring 1 connected in a rotationally conjoint manner to the torque-carrying part, namely the input shaft, was formed as an inner ring of the bearing, which inner ring mounted the input shaft with respect to a stationary housing by means of the outer rings 4, 4'. In a different exemplary embodiment, it can be provided that the inner ring of the bearing is formed in a stationary manner and the outer ring of the bearing is formed in a rotational manner; in this case, the permanent magnetization is formed on the body of the outer ring since the outer ring is connected in a rotationally conjoint manner to the torque-carrying part, namely the input shaft.

In the case of the exemplary embodiment described above, the bearing raceways 2, 2' were formed as rolling raceways of a rolling bearing with in particular spherical rolling bodies 15. It will be obvious that at least one of the two bearing raceways, in particular all the raceways, can also be formed as sliding raceways and are configured as sliding surfaces for a sliding partner of the other bearing ring of the bearing.

In the case of the exemplary embodiment described above, the coupling portion 8, 8' was formed as a multi-tooth connection or as a multi-edge connection. It will be obvious that the coupling portion can also comprise a thread into which a counter-thread of the input or the output shaft is fastened by screwing in. In so far as torques should be transmitted in both directions of rotation, the tightening torque for fixing the counter-thread of the shaft in the thread of the coupling portion should be configured to be higher than the maximum torque to be transmitted. Alternatively or additionally, latching bodies such as balls or bolts are provided which fix the connection of the two thread portions.

LIST OF REFERENCE NUMBERS

1 Bearing ring
2, 2' Bearing raceway
3 Magnetization
3a, 3b Magnetized portion
4, 4' Outer ring
5 Sleeve
6, 6a Evaluation unit
7, 7a Magnetic sensor
8, 8' Coupling portion
9 Axis of rotation
10 Outer lateral surface
11 Front surface
12 Portion
13 Central portion
14 Central plane
15 Rolling body

The invention claimed is:

1. A bearing ring, comprising a body comprised of a magnetostrictive material, with a first bearing raceway and a second axially spaced apart bearing raceway located on the body, and a permanent magnetization which is incorporated between the bearing raceways into a material of the body and runs around an axis of rotation of the body.

2. The bearing ring as claimed in claim 1, wherein the permanent magnetization has a first magnetized portion which runs around the axis of rotation in a first circumferential direction and an axially spaced apart second magnetized portion which runs around the axis of rotation in an opposite direction to the first circumferential direction.

3. The bearing ring as claimed in claim 1, wherein the permanent magnetization comprises a partial magnetization close to a surface which runs around the axis of rotation in a first circumferential direction and a radially spaced apart partial magnetization distant from the surface which runs around the axis of rotation in an opposite direction to the partial magnetization close to the surface.

4. The bearing ring as claimed in claim 1, wherein a coupling portion is provided at or close to an end of the body.

5. The bearing ring as claimed in claim 4, wherein the coupling portion comprises a feather spring, a multi-tooth connection, or a multi-edge connection.

6. The bearing ring as claimed in claim 4, wherein the coupling portion comprises a thread.

7. The bearing ring as claimed in claim 1, wherein at least one of the bearing raceways is arranged radially offset in relation to the axis of rotation opposite a portion having the permanent magnetization.

8. The bearing ring as claimed in claim 1, wherein the body is formed in one piece.

9. The bearing ring as claimed in claim 1, wherein the permanent magnetization is arranged axially centrally in relation to the two bearing raceways.

10. A bearing, comprising two bearing rings, wherein the first bearing ring, is formed according to claim 1.

11. The bearing ring as claimed in claim 1, wherein both of the bearing raceways are arranged radially offset in relation to the axis of rotation outside of portions having the permanent magnetization.

* * * * *